(12) United States Patent
Tomita

(10) Patent No.: US 7,080,121 B2
(45) Date of Patent: Jul. 18, 2006

(54) SYSTEM, METHOD, PROGRAM PRODUCT, AND APPARATUS FOR EQUIPMENT MANAGEMENT

(75) Inventor: Atsushi Tomita, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 754 days.

(21) Appl. No.: 09/824,833

(22) Filed: Apr. 4, 2001

(65) Prior Publication Data

US 2001/0029533 A1    Oct. 11, 2001

(30) Foreign Application Priority Data

Apr. 6, 2000   (JP)   ............................. 2000-104525

(51) Int. Cl.
   *G06F 15/16*   (2006.01)
(52) U.S. Cl. ...................... 709/206; 709/224
(58) Field of Classification Search ................ 709/205, 709/10, 237, 101, 224, 230, 206, 207; 395/114; 710/15; 370/235, 229
   See application file for complete search history.

(56) References Cited

U.S. PATENT DOCUMENTS

| | | | | |
|---|---|---|---|---|
| 5,187,780 A | * | 2/1993 | Clark et al. ................. | 710/106 |
| 5,328,278 A | * | 7/1994 | Kokubo ....................... | 400/74 |
| 5,390,351 A | * | 2/1995 | Di Giulio et al. ........... | 709/225 |
| 5,819,110 A | * | 10/1998 | Motoyama ................... | 710/15 |
| 5,842,043 A | * | 11/1998 | Nishimura ................... | 710/36 |
| 5,966,714 A | * | 10/1999 | Huang et al. ............... | 707/201 |
| 6,023,585 A | * | 2/2000 | Perlman et al. ............. | 717/178 |
| 6,067,561 A | * | 5/2000 | Dillon ........................ | 709/206 |
| 6,081,507 A | * | 6/2000 | Chao et al. ................. | 370/235 |
| 6,108,688 A | * | 8/2000 | Nielsen ...................... | 709/206 |
| 6,247,058 B1 | * | 6/2001 | Miller et al. ............... | 709/234 |
| 6,327,630 B1 | * | 12/2001 | Carroll et al. .............. | 719/314 |
| 6,366,959 B1 | * | 4/2002 | Sidhu et al. ................ | 709/231 |
| 6,389,016 B1 | * | 5/2002 | Sabaa et al. ................ | 370/389 |
| 6,449,622 B1 | * | 9/2002 | LaRue et al. ............... | 707/201 |
| 6,499,068 B1 | * | 12/2002 | Uchikawa .................... | 710/31 |
| 6,738,152 B1 | * | 5/2004 | Roth et al. ................. | 358/1.14 |
| 6,738,381 B1 | * | 5/2004 | Agnevik et al. ......... | 370/395.7 |
| 6,751,731 B1 | * | 6/2004 | Binding et al. ............. | 709/203 |

(Continued)

FOREIGN PATENT DOCUMENTS

EP        0 693 839 A2 *   4/1996

(Continued)

OTHER PUBLICATIONS

Packet Reordering is Not Pathological Network Behavior, Jon C. R. Bennett et al., 1999 IEEE.*

(Continued)

*Primary Examiner*—Jason Cardone
*Assistant Examiner*—Ajay Bhatia
(74) *Attorney, Agent, or Firm*—Buchanan Ingersoll PC

(57) ABSTRACT

A system, a method, a program product, and an apparatus for managing equipments are provided in which the management can properly be carried out even if a series of data are received in a reverse of the order of transmission. Upon receiving from a center a current mail carrying a command, a data terminal 1 for monitoring a copier compares the date-1 of the current mail with the date-2 of the latest of the previous mails carrying the same type of commands (S803). When the date-1 is later than the date-2, an action determined by the command carried in the current mail is performed (S811). If the date-1 is not later than the date-2, the current mail is discarded and the discarding is informed to the center (S821).

23 Claims, 7 Drawing Sheets

U.S. PATENT DOCUMENTS

| | | | |
|---|---|---|---|
| 6,772,223 B1* | 8/2004 | Corl et al. | 709/238 |
| 6,802,019 B1* | 10/2004 | Lauder | 713/400 |
| 6,925,605 B1* | 8/2005 | Bates et al. | 715/745 |
| 2001/0048662 A1* | 12/2001 | Suzuki et al. | 370/230 |
| 2002/0143924 A1* | 10/2002 | Iga | 709/223 |
| 2003/0046347 A1* | 3/2003 | Nishimura | 709/206 |
| 2003/0088629 A1* | 5/2003 | Berkowitz et al. | 709/206 |
| 2003/0110224 A1* | 6/2003 | Cazier et al. | 709/206 |
| 2003/0163530 A1* | 8/2003 | Ribak et al. | 709/206 |
| 2004/0095237 A1* | 5/2004 | Chen et al. | 340/506 |
| 2004/0230652 A1* | 11/2004 | Estrada et al. | 709/204 |

FOREIGN PATENT DOCUMENTS

| | | |
|---|---|---|
| JP | 4318731 | 11/1992 |
| JP | 4318859 | 11/1992 |

OTHER PUBLICATIONS

Dynamics of Random Early Detection, Dong Lin and Robert Morris, SIGCOMM '97 Cannes, France, 1997 ACM.*

Improving TCP/IP Performance over Wireless Networks, Hari Balakrishnan, MOBICOM 95 Berkeley CA USA, 1995 ACM.*

PNO-ISC/SPEC/009, Issue1 Draft F, Sep. 2001.*

* cited by examiner

SYSTEM, METHOD, PROGRAM PRODUCT, AND APPARATUS FOR EQUIPMENT MANAGEMENT

This application is based on Application No. 2000-104525 filed in Japan, contents of which is hereby incorporated by reference.

BACKGROUND OF INVENTION

1. Field of the Invention

The present invention relates to a system, a method, a program product, and an apparatus for equipment management where various data received from equipment are transferred to a management center by an equipment management apparatus linked to the equipment while the equipment management apparatus and it the management center exchange relevant commands with each other for controlling the conditions of the equipment.

2. Description of Related Art

Commonly, an equipment management system is provided, for example, when used for controlling the conditions of a copier, where a copier management apparatus joined to the copier is linked by a telephone network to a management center which can thus monitor maintenance conditions of the copier. The management center is located in a management servicing firm for determining some measurements depending on the conditions of the copier. For example, the management center receives from the copier management apparatus a piece of information indicating that the copier is down and needs amendment. Then, the management servicing firm provides a service of dispatching a maintenance service worker to the copier. Such a conventional system is linked to a public telephone network for exchanging communications between terminals of the management apparatus and the center. As long as the line is not busy, this allows each action of communications between two terminals to be uniformly carried out with a minimum delay. Also, as a variety of communications technologies are proposed today, the action of communications may be implemented using electronic mails over the Internet.

In an electronic-mail communications system, the exchange of data between the copier management apparatus and the management center is based on a packet mode transmission. More specifically, packets of data are conveyed step by step in such a manner like bucket brigade. Hence, the delay of transmission between the two terminals may hardly be predicted. There is much probability of encountering any unexpected incident during the transmission of data, such as staying of a packet or change of the transmission path. If worse, a series of electronic mails transmitted from the receiver may be received in an inverse or jumbled order at the receiver. When the electronic mails (including commands for the copier management) from the management center are received in an inverse order by the copier management apparatus, they may be handled and processed in adverse manners. As a result, the action of the copier management apparatus will be different from what the management center intended. Accordingly, the conditions of the copier will be ill-managed and declined if worse.

SUMMARY OF THE INVENTION

The present invention has been developed for eliminating the above problems of the conventional equipment management system which allows the exchange of data such as electronic mails involving change of transmission-delay time between the equipment management apparatus and the management center. It is thus an object of the present invention to provide a system, a method, a program product, and an apparatus for equipment management where the management can properly be conducted even when a series of data are received in a fault or reverse of the order of transmission.

As an aspect of the present invention, an equipment management system or method having an equipment management apparatus for monitoring equipment and a management center for exchanging communications with the equipment management apparatus, wherein the conditions of the equipment are controlled by a combination of the equipment management apparatus and the management center, is provided comprises steps of:

transmitting command data together with a piece of information about transmission order of the data from the management center to the equipment management apparatus or vice versa;

when a current command data is received, comparing the first information about transmission order assigned to the current command data with the second information which is the latest information about transmission order assigned to one of the previous command data;

performing an action of management according to the current command data when the first information about transmission order is later than the second information; and discarding the current command data when the first information about the order of transmission is not later than the second information.

As another aspect of the present invention, an equipment management apparatus for monitoring equipment and controlling the conditions of the equipment according to a command data received from a management center is provided comprises:

a memory for storing an information about transmission order assigned to a command data received;

a comparator for when a current command data is received, comparing first information about order of transmission assigned to the current command data with second information which is the latest information about transmission order assigned to one of previous command data stored in the memory; and a controller for performing an action of management according to the current command data when the first information about the order of transmission is later than the second information, and discarding the current command data when the first information about the order of transmission is not later than the second information.

As a further aspect of the present invention, an equipment management method having an equipment management apparatus for monitoring equipment and controlling the conditions of the equipment according to a command data received from a management center, is provided comprises steps of:

storing an information about an order of transmission assigned to a command data received;

when a current command data is received, comparing first information about order of transmission assigned to the current command data with second information which is the latest information about transmission order assigned to one of previous command data;

performing an action of management according to the current command data when the first information about the order of transmission is later than the second information; and discarding the current command data when the first information about the order of transmission is not later than the second information.

According to the present invention, when a current command data is transmitted from the management center to the equipment management apparatus or vice versa, an action determined by the command data can not always be performed at the receiver side. More particularly, the receiver side compares the first information about the transmission order assigned to the current command data with the second information which is the latest information about the transmission order assigned to one of the previous command data. When the order of transmission in the first information is later than the order of transmission in the second information, an action determined by the current command data is performed. If the transmission order in the first information is not later than the transmission order in the second information, the current command data is discarded and its commanding action will not be performed. Accordingly, as any fault management of performing the action determined by a previously transmitted command data is inhibited, the conditions of the equipment can favorably be maintained.

The object of the present invention for providing a system, a method, and an apparatus for equipment management where the management can properly be conducted even when a series of data are received in a fault or reverse of the order of transmission can thus be implemented.

DETAILED DESCRIPTION OF THE PREFERRED EMBODIMENTS

Preferred embodiments of the present invention will be described in more detail referring to the accompanying drawings. It is noted throughout the embodiments that the equipment to be controlled by the equipment management apparatus is a copier.

Figure 1:
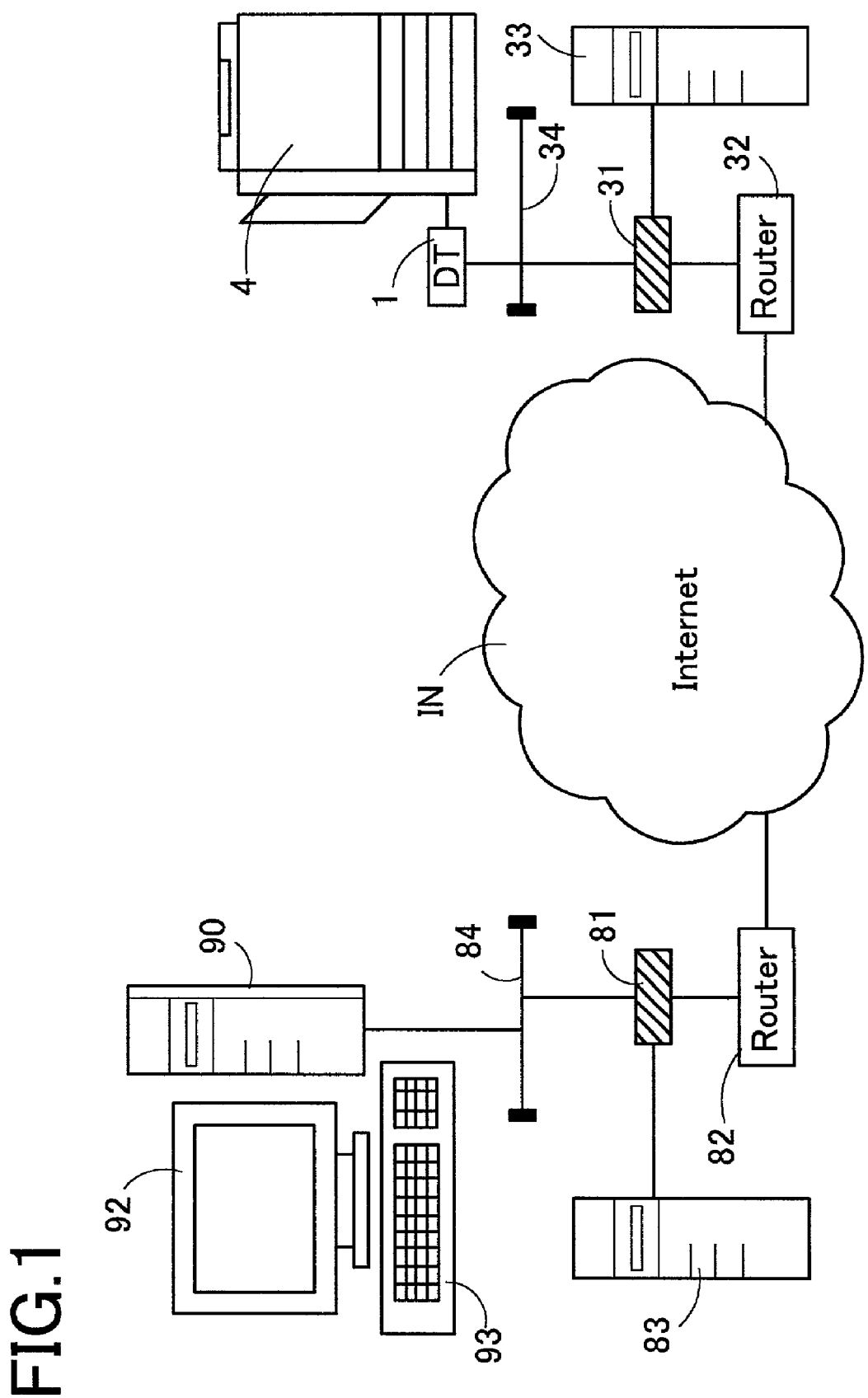
FIG. 1 is a schematic view of a copier management system showing one embodiment of the present invention.

FIG. 1 is a schematic view of a copier management system showing one embodiment of the present invention. The system has a data terminal 1 and a copier 4 provided at a user side and a computer 90 provided at a center side for controlling the conditions of the copier 4. The data terminal 1 at the user side, including a CPU, is for receiving and processing various data of information about the copier 4 and transferring them to the computer 90 at the center side. For the purpose, the data terminal 1 is connected via a LAN 34 to a fire wall 31 and further via a router 32 to the Internet denoted by IN. The LAN 34 is also connected to a mail server 33 for transmission and reception of electronic mails.

The computer 90 at the center side receives and examines the data of the copier 4 from the data terminal 1 to store a data of copier management. The computer 90, including a CPU, is connected to a display 92 and a keyboard 93. Also, the computer 90 is connected via a LAN 84 to a fire wall 81 and further via a router 82 to the Internet IN for communication with the data terminal 1 at the user side. The LAN 84 is connected to a mail server 83 for transmission and reception of electronic mails (hereinafter referred to as e-mail(s)) or mail(s). The system thus allows the center side to control the conditions of the copier 4 at the user side. In the system, the e-mails are used for communication between the user side and the center side. This permits the data to pass through the fire walls 31 and 82 at both the sides. The e-mails carry the copier data as well as relevant commands (which will be explained later in more detail).

The copier 4 and the data terminal 1 are now explained in more detail. The copier 4 has a CPU connected with a group of counters for producing data for the fee of copying calculated by the computer 90 at the center side (including a total counter for counting the number of paper sheets discharged and sub counters each counting the number of copied sheets of a given size) and another group of counters for producing data for the maintenance service (including jam counters each counting the number of jamming incidents, trouble counters each counting the number of troubles at its location, and PM counters each counting the number of actions for determining the need of maintenance service). The outputs of the counters are transferred to the CPU in the data terminal 1. The PM counter means a process maintenance counter for counting the number of operation actions of each component. The outputs of the PM counters may be used for determining the replacement of the component with a new one.

The copier 4 also includes a set of sensors mounted to the selected elements thereof which may have roles for producing images. The element data from the sensors are processed by CPU of the copier and then transferred to the CPU in the data terminal 1. Characteristic examples of the element data are the duration for transferring a paper sheet, the surface potential of a photosensitive drum, the concentration of a toner in a developer, the exposure of the photosensitive drum, the bias voltage for development, and the grid voltage in a static charger.

The data terminal 1, which receives the data from the copier 4, sends an e-mail through the mail server 33 to the CPU of the computer 90 carrying the count data and the element data of the copier. The mail server delivers the e-mail in a packet format to mail server 83 at the center side. Also, the data terminal 1 receives via mail server 33 an e-mail from the computer 90 at the center side as the packet data for the copier 4. For the purpose, the data terminal 1 includes a memory for storing the data received from the center side.

Figure 2:
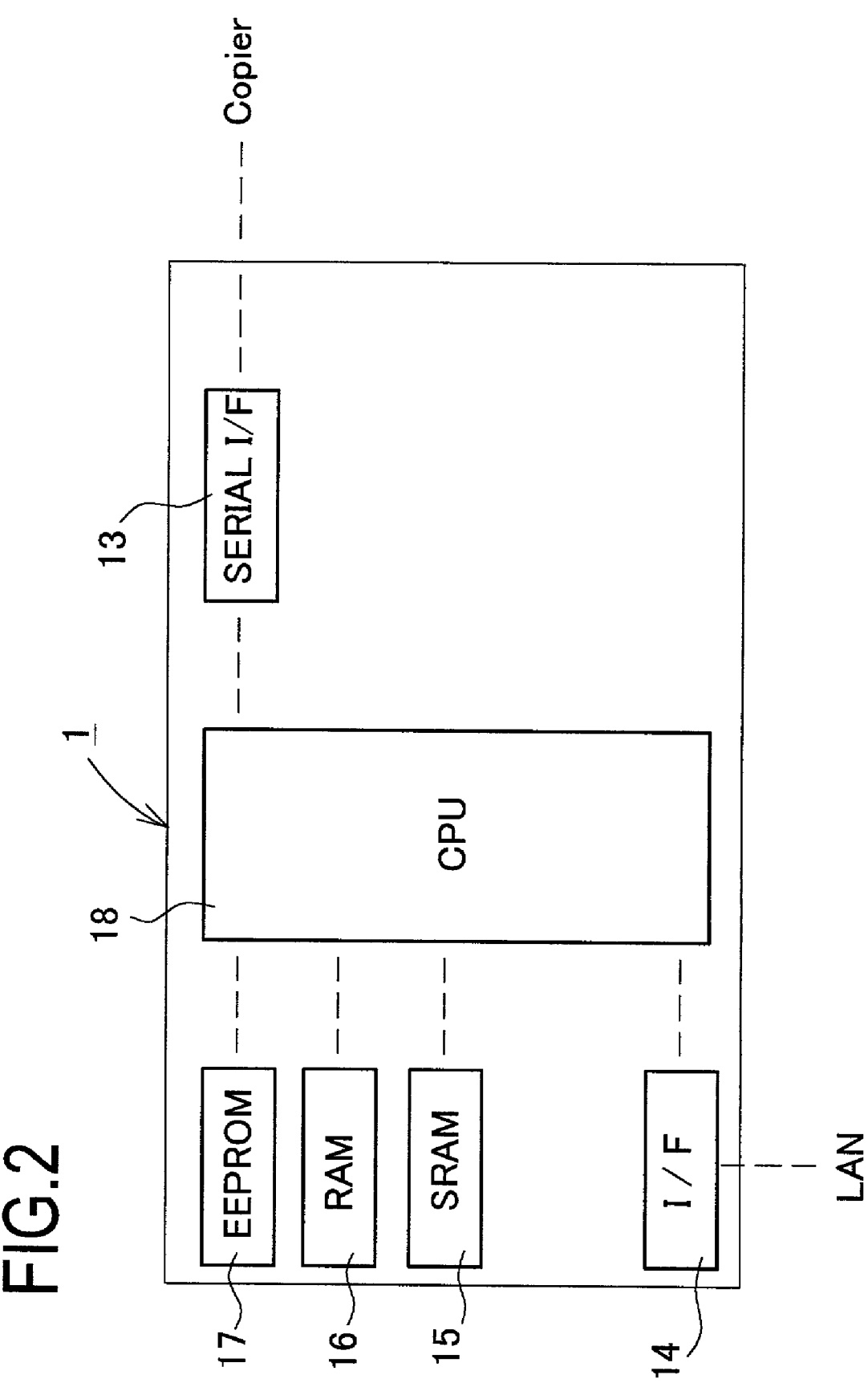
FIG. 2 is a schematic diagram explaining structure of data terminal.

FIG. 2 illustrates a schematic structure of the data terminal 1. A copier is connected to the data terminal 1 via a serial interface 13, for example, and a LAN is connected thereto via an interface 14 compatible with TCP/IP, for example. An EEPROM 17 stores program to execute processing shown in FIG. 4. The program is readout by a RAM 16 and then, executed by a CPU 18. Various data received during communications are stored in a SRAM 15 or an EEPROM 17, both of which are backed-up by battery or the like.

Figure 3:
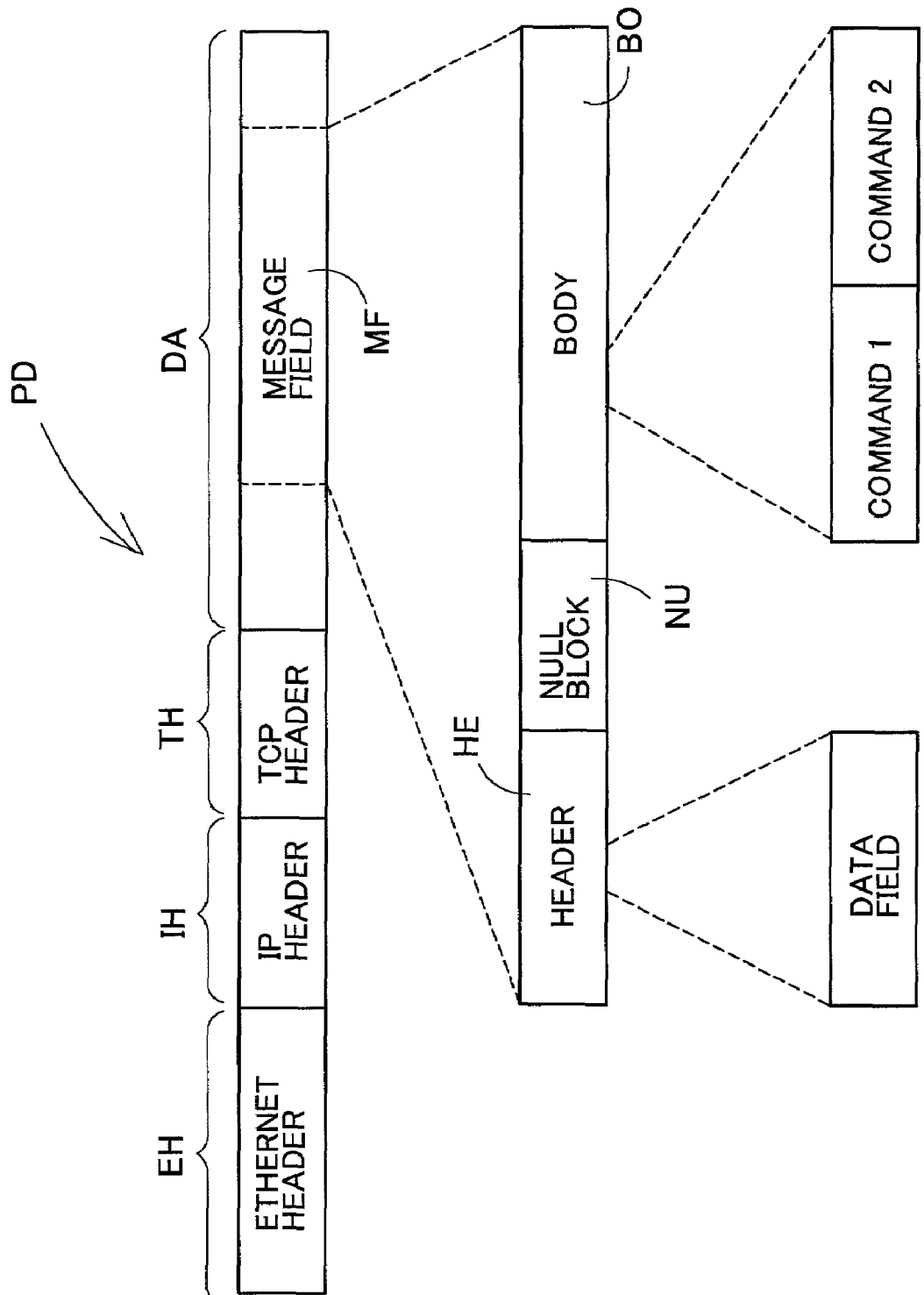
FIG. 3 is a diagram explaining a packet data exchanged between a data terminal and a center.

FIG. 3 illustrates a structure of the packet data. As shown in FIG. 3, the packet data denoted by PD consists mainly of an Ethernet (a registered trademark) header EH carrying the address of a receiver hardware and the address of a transmitter hardware, an IP header IH carrying the address of a transmitter IP and the address of a receiver IP, a TCP header TH carrying the port number of the transmitter and the port number of the receiver, and a data block DA. The data block DA in an e-mail includes a message field MF. The message field MF consists mainly of a header HE, a null block NU carrying non, and a body BO. More specifically, the header HE includes a data field where the date of transmission is carried. The body BO carries various commands including, when the packet data PD is transferred from the center side to the data terminal 1, a command for demanding the copier 4 to perform a particular action.

Figure 4:
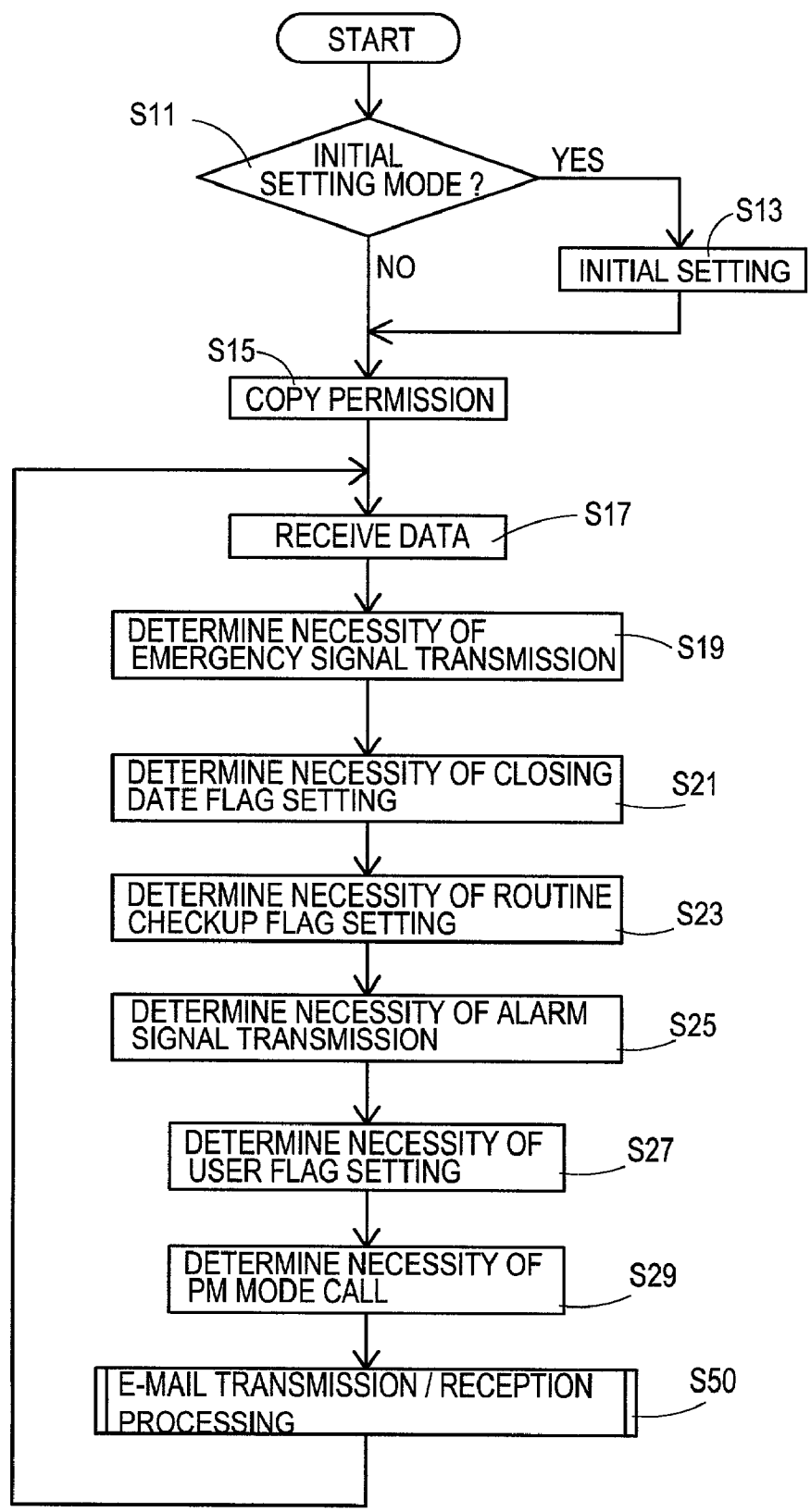
FIG. 4 is a flowchart showing a main routine of process in the data terminal.

The controlling on the system will now be described in conjunction with the flowchart. FIG. 4 is the flowchart showing the controlling action of the CPU in the data terminal 1. The action of the CPU is commenced by connecting the power supply. It is first examined at S11 whether or not the initial setting mode is asked. When so ("YES" at S11), the procedure goes to S13 for carrying out the initial setting. The initial setting includes setting of the mail address of the center side, the ID number (DTID) of the data terminals 1, and the ID number (center ID) of the center, and execution of the initial transmission.

This is followed by S15 for delivering a copy permission signal to the CPU of the copier 4. If the initial setting is not asked at S11("NO" at S11), the procedure bypasses S13 and advances directly to S15 where the copy permission signal is released. Then, the data is received at S17. More particularly, the various data about the conditions of the copier 4 are received from the CPU of the copier 4 and processed. The data include a sheet discharge code, a jamming trouble code, jamming trouble counts, sheet size based counts, PM counts, and element data. The CPU of the data terminal 1 is constantly updated with the latest of the data.

It is then examined at S19 whether or not an emergency signal such as a trouble data or a recovery data is transmitted to the center side. S21 follows where the closing date is checked. More specifically, when the closing date arrives, a closing date flag is turned on. This permits the total count and the sheet size based counts from which the fee of copying is calculated are transferred to the center side. After the transmission of the data, the center side issues a new date at the next closing. Then, S23 is followed where the routine checkup date is checked. When a routine checkup flag is turned on, the data about the conditions of the copier 4 are transferred to the center. After the transmission of the data, the center issues a new date for the next checkup together with the current time and date.

It is compared at S25 between the element data and their threshold, namely, between the count of each jamming counter and its threshold and between the count of each PM counter and its threshold. It is then checked from the result of the comparison whether or not alarm data or alarm release data is transmitted to the center. S27 is followed where the user mode is checked. When the initial setting mode is not involved, a user flag is turned on by pressing a corresponding switch. This allows the various data about the conditions of the copier 4 to be transferred to the center. It is then checked at S29 that the PM mode is involved. When any PM counter is reset to zero by the replacement of a component, it is judged that the PM mode is called. Accordingly, the count of the PM counter before the resetting is transferred to the center. Finally, at S50, when any of the above-described flags is turned on, the data pertinent to the flag is released to the Internet as a packet data forwarded to the center. Simultaneously, the packet data received from the center is read at the data terminal.

Figure 5:
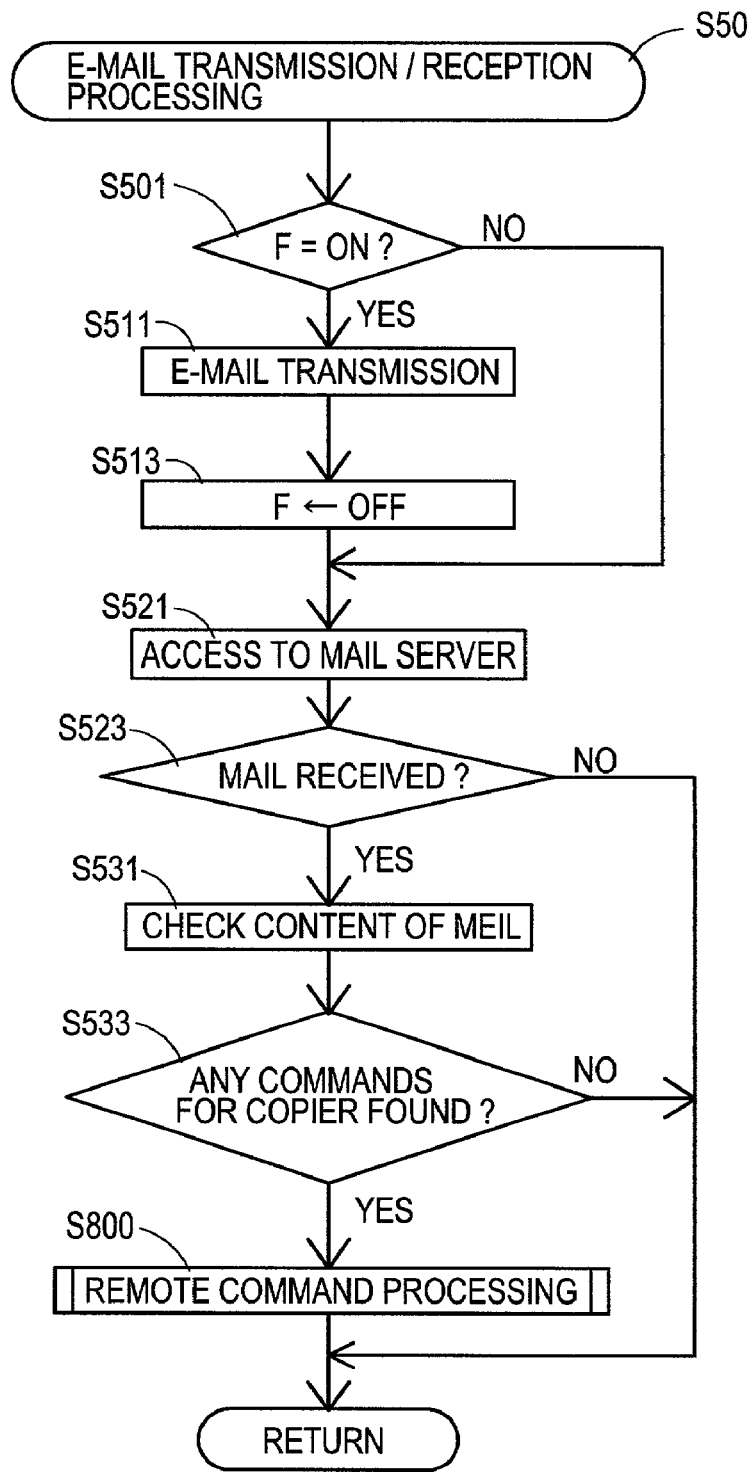
FIG. 5 is a flowchart of a procedure of transmission and reception of mail data in the data terminal.

The sub routine at S50 for transmission and reception of mails will be described referring to FIG. 5. The routine starts with S501 for examining whether or not any flag is turned on. When one of the flags is turned on ("YES" at S501), the procedure advances to S511 where the data corresponding to the flag is transmitted as an e-mail to the center. In other words, the data is released to the Internet as a packet data forwarded to the center. S513 is followed for turning off the flag and the procedure moves to S521. When it is judged at S501 that no flag is turned on ("NO" at S501), the procedure bypasses S511 and S513 and jumps to S521.

At S521, the mail server 33 is accessed to receive a mail forward to the data terminal 1. This is followed by S523 for examining whether any mail is received or not. When a mail (referred to as the current mail herein after) is received ("YES" at S523), content of the mail is checked at S531. The mail sent from the center to the data terminal 1 may include a (setting modification command) command for modifying the setting of the copier 4, a (action command) command for demanding a particular action of the copier, and time data such as the current date, the date of the next setting, and the next closing date. Those data are stored in a memory in the data terminal 1. If no current mail is received ("NO" at S523), the procedure jumps the following steps and exits the sub routine for transmission and reception of mails.

After the mail is checked at S531, it is examined at S533 whether or not the current mail includes a setting modification command or an action command. When any of such commands for the copier 4 is found ("YES" at S533), the procedure goes to S800 for executing the remote command control. If the current mail includes no such command for the copier 4 ("NO" at S533), the procedure jumps S800 and exits the sub routine.

Figure 6:
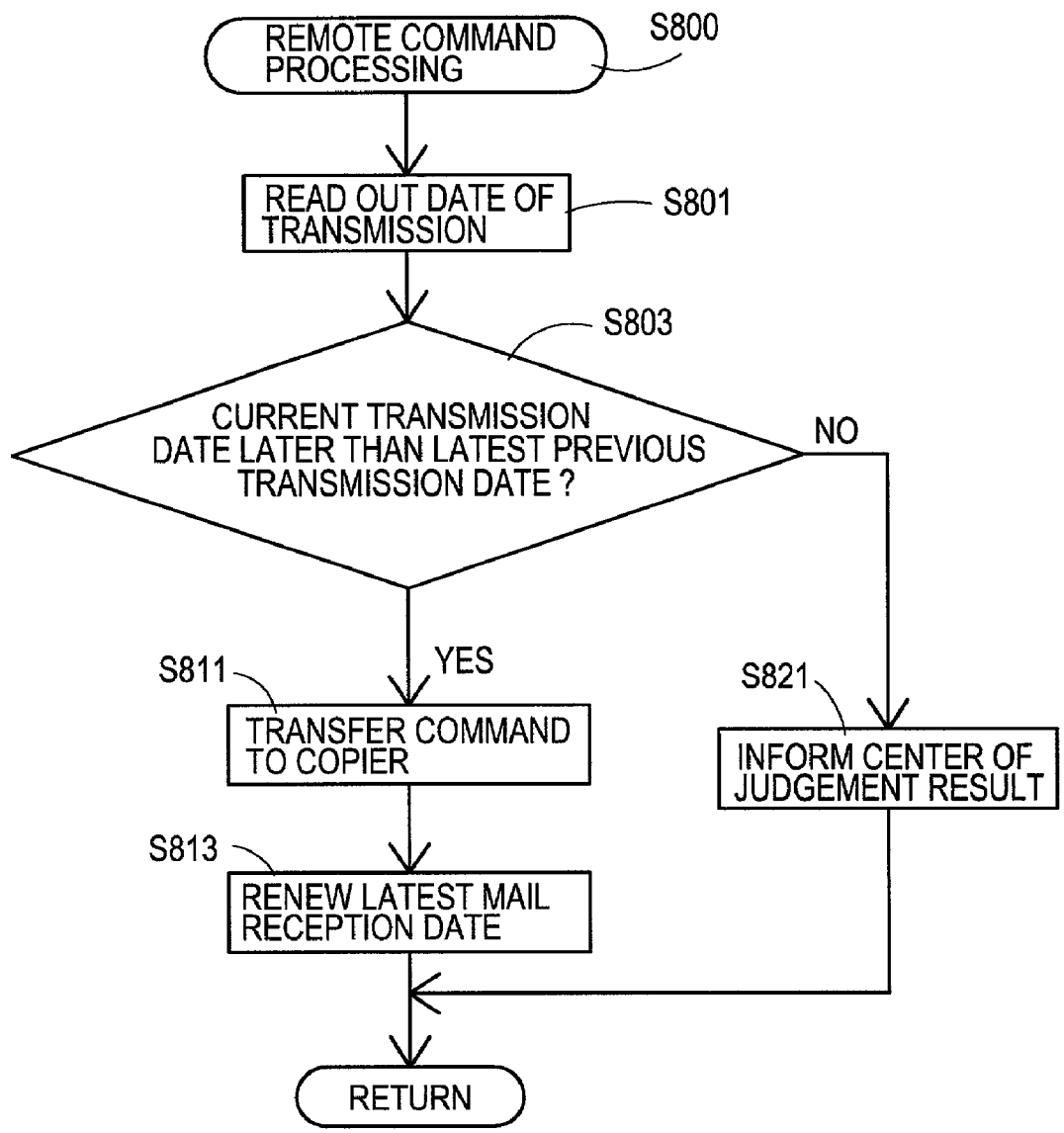
FIG. 6 is a flowchart of a procedure after a command from the center is received by the data terminal.

The sub routine at S800 for executing the remote command control will now be explained referring to FIG. 6. It is assumed that the command transmission sequence data is the date saved in the date field of a mail. The sub routine starts with S801 for reading out the date of transmission from the current mail received from the center. The date (referred to as the date 1 hereinafter) indicates the day and the time when the current mail is transmitted from the center.

This is followed by S803 where the date-1 read out at S801 is compared with the date-2. The date-2 is the latest of the day and time data contained in the mails received in the past at the data terminal 1 (referred to as the previous mail) including a command which is of the same type as the setting modification command or the action command of the current mail. When the date-1 is later than the date-2 ("YES" at S803), the procedure goes to S811 for transferring the command received from the center to the CPU of the copier 4. This permits the copier 4 to perform an action determined by the command. Finally, the date-2 is overwritten or replaced by the date-1 at S813 and the procedure exits this routine.

If it is judged at S803 that the date 1 is not later than the date-2 ("NO" at S803), the procedure goes to S821 for informing the center of the result of judgment. As the procedure bypasses S811 and S813, it exits the sub routine. In other words, when the mails are received in a reverse of the transmission order, the setting modification command or the action command carried in the current mail (dated earlier) will be neglected.

This inverse reception may be pertinent to the communications with e-mails. Since the command data are transferred from the center to the data terminal 1 step by step in such a manner like bucket brigade, their paths may often be changed due to local congestion. As a result, the data are received at the data terminal 1 in a reverse of the transmission order of the center. When the command carried in the current mail dated earlier is executed, it may be unfavorable for the management of the copier 4. In this embodiment, the date-1 of the current mail is compared with the date-2 of the previous mail to identify the up-to-date command regardless of the order of reception of the mails for successfully controlling the conditions of the copier 4.

The data of the transmission order of the commands is not limited to the date field data. For example, the count data which counts up whenever a mail carrying a remote control command is released from the center may be used with equal success. In action, the data terminal 1 saves the count of the previous mail, instead of the date, and compares the count in the current mail with the previous count.

Figure 7:
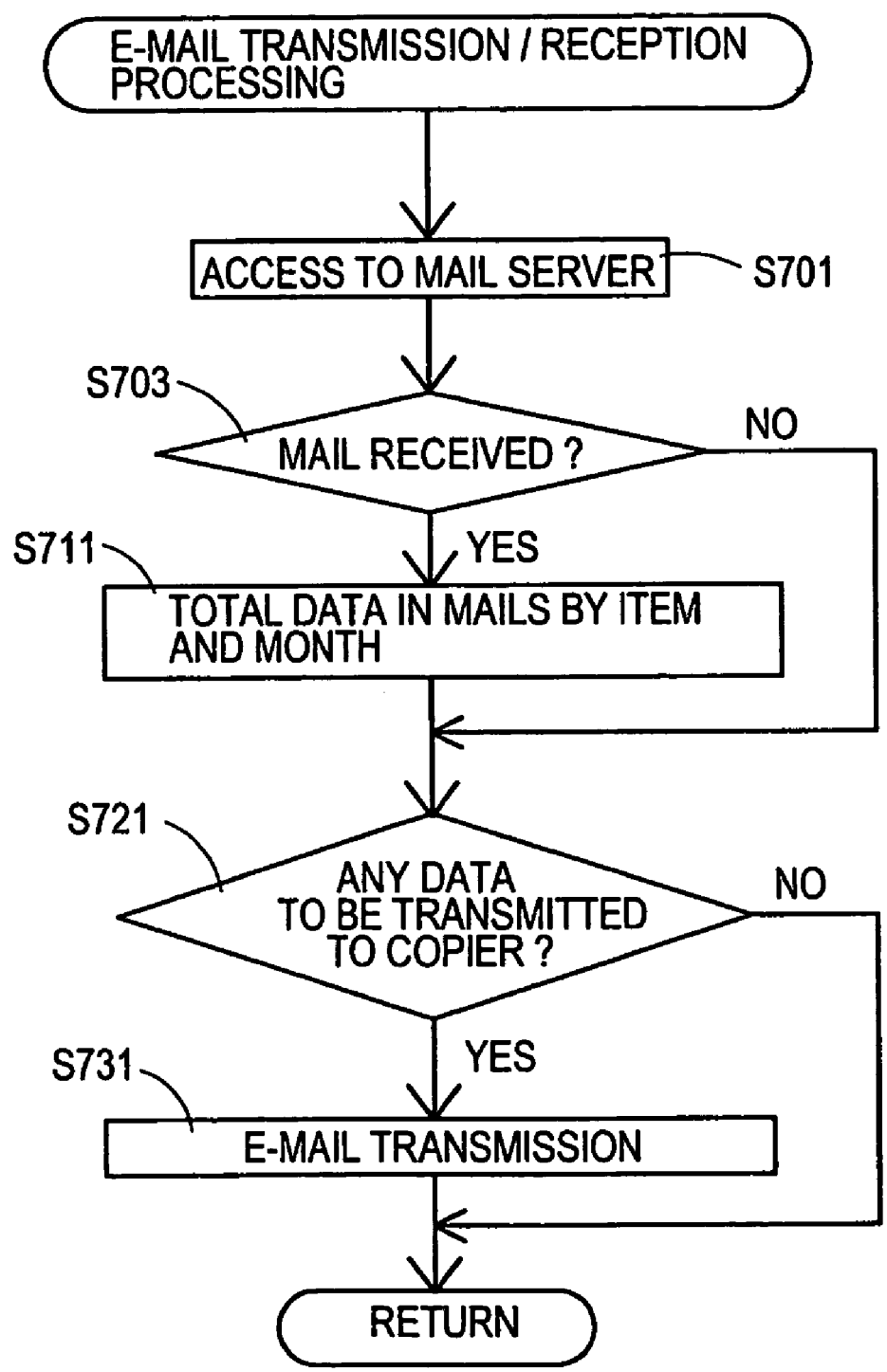
FIG. 7 is a flowchart of a procedure of transmission and reception of mail data in the center.

Finally, the process at the center will be explained referring to FIG. 7. At S701, the mail server 83 is accessed for checking the mail for the center. It is then examined at S703 whether or not a mail is received from the data terminal 1. When a mail is received ("YES" at S703), the procedure goes to S711 for sorting the data in the mail by item and month. Simultaneously, the data to be displayed for an operator is produced. Also, when the information (about a reverse of the order at the reception) generated at S821 is carried in the mail, it is checked. This allows the center to acknowledge whether or not the command is correctly received and executed at the user side. Then, the procedure goes to S721. When it is judged at S703 that no mail is received ("NO" at S703), the procedure jumps S711 to S721.

It is then examined at S721 whether or not there is any data to be transmitted to the copier 4. The data to be transmitted to the copier 4 includes a setting modification command, action commands, current date, the date for the next setting, and the next closing date. When there is any data to be transmitted ("YES" at S721), the procedure moves to S731 for transmitting the data as an e-mail to the data terminal 1 of the copier 4 and exits the sub routine for transmission and reception of mails. If no data to be transmitted is found ("NO" at S721), the procedure jumps S731 and exits this routine.

As set forth above, this embodiment permits the center to transfer the various commands together with their date data to the data terminal 1 at the user side which in turn controls the conditions of the copier 4 according to the commands. Upon receiving the current mail carrying the command from the center ("YES" at S533), the data terminal 1 compares the date-1 assigned to the current mail with the date-2 assigned to the latest of the previous mails (S803). When the date-1 is later than the date-2, the command carried in the current mail is executed (S811). If the date-1 is not later than the date-2, the command in the current mail is discarded. The data terminal 1 responds to not all the commands received but the command carried in the latest transmitted mail. Thereby, the conditions of the copier 4 can favorably be controlled by the data terminal 1. When the data terminal 1 discards the command, it informs the center of the discarding (S821). Accordingly, while the system allows the commands to be transmitted and received in the form of e-mails without being affected by pertinent delays which may hardly be uniform, it can control the conditions of the copier 4.

The program for the equipment management in this embodiment apparatus may be provided as a program product. Such a program product includes computer program itself, and recording media storing the program such as FD, CD-ROM, ROM, and the like.

The present invention is not limited to the foregoing embodiments which are simply illustrative. It is hence understood that various changes and modifications may be made without departing from the scope of the present invention. For instance, the equipment to be controlled by the data terminal 1 is not limited to the copier. When the data terminal 1 has some dedicated commands to be transmitted to the center, the teaching may be applicable to the dedicated commands.

What is claimed is:

1. An equipment management system having an equipment management apparatus for monitoring equipment and a management center for exchanging communications with the equipment management apparatus, wherein the conditions of the equipment are controlled by a combination of the equipment management apparatus and the management center, the system comprising:
   a transmitter for transmitting command data together with a piece of information about transmission order of the data from the management center to the equipment management apparatus or vice versa;
   a comparator for, when current command data is received, comparing first information about transmission order assigned to the current command data with second information about transmission order assigned to previous command data;
   a controller for performing an action of management according to the current command data when the first information about the transmission order is later than the second information, and for discarding the current command data when the first information about the transmission order is not later than the second information.

2. An equipment management system according to claim 1, wherein the command data are classified into plural types, and the second information is the latest information about the transmission order assigned to previous command data of the same type as the current command data.

3. An equipment management system according to claim 1, wherein when the current command data is discarded, the discarding is informed from the equipment management apparatus to the management center or vice versa.

4. An equipment management system according to claim 1, wherein the equipment to be monitored by the equipment management apparatus is an image generating apparatus, and the command data received from the management center includes at least one selected from a group of the date of the next routine transmission, the next closing date, and action commands.

5. An equipment management system according to claim 1, wherein the equipment management apparatus and the management center exchange communications with each other in a form of electronic mails.

6. An equipment management system according to claim 1, wherein the information about the transmission order assigned to the command data is the date and time of transmission.

7. An equipment management system according to claim 1, wherein the information about the transmission order assigned to the command data is sequence numbers determined by the transmission order.

8. An equipment management method using an equipment management apparatus for monitoring equipment and a management center for exchanging communications with the equipment management apparatus, wherein the conditions of the equipment are controlled by a combination of the equipment management apparatus and the management center, the method comprising steps of:

transmitting command data together with a piece of information about transmission order of the data from the management center to the equipment management apparatus or vice versa;

when current command data is received, comparing first information about the transmission order assigned to the current command data with second information about transmission order assigned to previous command data;

performing an action of management according to the current command data when the first information about the transmission order is later than the second information; and discarding the current command data when the first information about the order of transmission is not later than the second information.

9. An equipment management method according to claim 8, wherein the command data are classified into plural types, and the second information is the latest information about the transmission order assigned to previous command data of the same type as the current command data.

10. An equipment management method according to claim 8, wherein when the current command data is discarded, the discarding is informed from the equipment management apparatus to the management center or vice versa.

11. An equipment management method according to claim 8, wherein the equipment to be monitored by the equipment management apparatus is an image generating apparatus, and the command data received from the management center includes at least one selected from a group of the date of the next routine transmission, the next closing date, and action commands.

12. An equipment management method according to claim 8, wherein the equipment management apparatus and the management center exchange communications with each other in a form of electronic mails.

13. An equipment management method according to claim 8, wherein the information about transmission order assigned to the command data is the date and time of transmission.

14. An equipment management method according to claim 8, wherein the information about transmission order assigned to the command data is sequence numbers determined by the transmission order.

15. An equipment management apparatus for monitoring an equipment and controlling the conditions of the equipment according to command data received from a management center, the apparatus comprising:

a memory for storing information about transmission order assigned to received command data;

a comparator for, when current command data is received, comparing first information about transmission order assigned to the current command data with second information about transmission order assigned to previous command data stored in the memory; and a controller for performing an action of management according to the current command data when the first information about the order of transmission is later than the second information, and discarding the current command data when the first information about the order of transmission is not later than the second information.

16. An equipment management apparatus according to claim 15, wherein the command data are classified into plural types, and the second information is the latest information about the transmission order assigned to previous command data of the same type as the current command data.

17. An equipment management apparatus according to claim 15, further comprising a cancel-informing means for, when the current command data is discarded, informing the management center of the discarding.

18. An equipment management apparatus according to claim 15, wherein the equipment to be monitored by the equipment management apparatus is an image generating apparatus, and the command data received from the management center includes at least one selected from a group of the date of the next routine transmission, the next closing date, and action commands.

19. An equipment management apparatus according to claim 15, wherein its communication with the management center is made by exchanging electronic mails.

20. An equipment management apparatus according to claim 15, wherein the information about the transmission order assigned to the command data is the date and time of transmission.

21. An equipment management apparatus according to claim 15, wherein the information about the transmission order assigned to the command data is sequence numbers determined by the order of transmission.

22. An equipment management method for monitoring equipment and controlling the conditions of the equipment according to command data received from a management center, comprising the steps of:

storing information about transmission order assigned to received command data;

when current command data is received, comparing first information about order of transmission assigned to the current command data with second information about transmission order assigned to previous command data; and performing an action of management according to the current command data when the first information about the transmission order is later than the second information, and discarding the current command data when the first information about the transmission order is not later than the second information.

23. A program product for an equipment management apparatus which monitors equipment and controls the conditions of the equipment according to command data received from a management center, the program product embodied on a computer readable medium enabling the equipment management apparatus to:

store information about transmission order assigned to command data received;

compare first information about transmission order assigned to current command data with second information about transmission order assigned to previous command data when the current command data is received; and perform an action of management according to the current command data when the first information about the transmission order is later than the second information, and discard the current command data when the first information about the transmission order is not later than the second information.

* * * * *